United States Patent [19]
Challberg et al.

[11] Patent Number: 6,097,779
[45] Date of Patent: Aug. 1, 2000

[54] FUEL BUNDLE AND CONTROL ROD ASSEMBLY FOR A NUCLEAR REACTOR

[75] Inventors: Roy C. Challberg, Livermore; Larry E. Fennern, San Jose, both of Calif.; Russell M. Fawcett, Wilmington, N.C.

[73] Assignee: General Electric Company, Schenectady, N.Y.

[21] Appl. No.: 09/024,867

[22] Filed: Feb. 17, 1998

Related U.S. Application Data

[60] Provisional application No. 60/051,290, Jun. 30, 1997.

[51] Int. Cl.[7] ............................................ G21C 1/04
[52] U.S. Cl. ..................... 376/353; 376/434; 376/438; 376/362; 376/364
[58] Field of Search ..................... 376/353, 362, 376/364, 434, 448

[56] References Cited

U.S. PATENT DOCUMENTS

| | | | |
|---|---|---|---|
| 3,878,042 | 4/1975 | Curulla et al. ............................ | 176/78 |
| 4,544,522 | 10/1985 | Curulla et al. ............................ | 376/441 |
| 4,585,614 | 4/1986 | Helmersson ............................. | 376/434 |
| 4,615,862 | 10/1986 | Huckestein ............................. | 376/362 |

OTHER PUBLICATIONS

Brettschuh et al, Reducing Outage Times at German BWRs, Nuclear Engineering International, p. 42, Nov. 1987.

*Primary Examiner*—Charles T. Jordan
*Assistant Examiner*—Jack Keith
*Attorney, Agent, or Firm*—Armstrong Teasdale LLP

[57] ABSTRACT

Fuel bundle and control rod assemblies for a nuclear reactor are described. In one embodiment of the apparatus, the nuclear reactor includes several conventional size fuel bundles and at least one large control rod. The large control rod includes four fuel bundle receiving channels, and each such channel is sized to receive four conventional size fuel bundles.

16 Claims, 12 Drawing Sheets

FUEL BUNDLE AND CONTROL ROD ASSEMBLY FOR A NUCLEAR REACTOR

CROSS REFERENCE TO RELATED APPLICATION

This application claims the benefit of U.S. Provisional Application No. 60/051,290, filed Jun. 30, 1997.

FIELD OF THE INVENTION

This invention relates generally to nuclear reactors and, more particularly, to a fuel bundle and control rod assembly for such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds the both the core plate and the top guide. The top guide includes several openings, and fuel bundles are inserted through the openings and are supported by the core plate.

A plurality of openings are formed in the bottom head dome so that components, such as control rod drive assemblies, can extend within the RPV. As an example, for a control rod drive assembly, a control rod drive housing, e.g., a tube, is inserted through the bottom head dome opening and a control rod drive is inserted through the control rod drive housing. The control rod drive is coupled to a control rod to position the control rod within the core.

A nuclear reactor core includes individual fuel assemblies that have different characteristics that affect the strategy for operation of the core. For example, a nuclear reactor core has many, e.g., several hundred, individual fuel bundles that have different characteristics. Such bundles preferably are arranged within the reactor core so that the interaction between the fuel bundles satisfies all regulatory and reactor design constraints, including governmental and customer specified constraints. In addition to satisfying the design constraints, since the core loading arrangement determines the cycle energy, i.e., the amount of energy that the reactor core generates before the core needs to be refreshed with new fuel elements, the core loading arrangement preferably optimizes the core cycle energy.

In order to furnish the required energy output, the reactor core is periodically refueled with fresh fuel assemblies. To optimize core cycle energy, the higher reactivity bundles may be positioned at an inner core location. To satisfy some design constraints, however, higher reactivity bundles generally are positioned at an outer core location. The most depleted fuel bundles, i.e., the bundles with the least remaining energy content, are removed from the reactor. The interval between refuelings is referred to as a cycle of operation.

During the course of the cycle of operation, the excess reactivity, which defines the energy capability of the core, is controlled in two ways. Specifically, a burnable poison, e.g., gadolinia, is incorporated in the fresh fuel. The quantity of initial burnable poison is determined by design constraints typically set by the utility and by the NRC. The burnable poison controls most, but not all, of the excess reactivity.

Control rods also control the excess reactivity. Specifically, the reactor core contains control rods which assure safe shutdown and provide the primary mechanism for controlling the maximum power peaking factor. The total number of control rods available varies with core size and geometry, and is typically between 50 and 205. The position of the control rods, i.e., fully inserted, fully withdrawn, or somewhere between, is based on the need to control the excess reactivity and to meet other operational constraints, such as the maximum core power peaking factor.

One known control rod includes a central portion having four radially extending blades. The blades define four fuel bundle channels, and when inserting the control rod into the core, the control rod is positioned so that one fuel bundle is positioned within each channel. Therefore, for example, approximately 100 control rods are included in a reactor having 400 fuel bundles.

To reduce the number of control rods necessary for efficient operation, one known reactor includes fuel bundles with an interior water gap arranged in a K-lattice configuration. Each fuel bundle in such reactor is substantially larger than a conventional size fuel bundle, and represents twice the pitch as the conventional BWR fuel configuration. The larger fuel bundles facilitate increasing the peaking factor of the BWR core. Particularly, the maximum channel integrated power, i.e., highest radial peaking factor, is greater for such large twice pitch K-lattice fuel bundle core than for a core loaded with conventional size fuel bundles. The maximum channel peaking factor for the large twice pitch bundle core, for example, is approximately 1.7, whereas the maximum channel peaking factor for a conventional core typically is approximately about 1.4 or 1.5.

Such larger fuel bundles also facilitate reducing the number of control rod drives, and thus reduce the capital cost of the reactor. Particularly, fuel assemblies including such twice pitch bundles are approximately four times the size of conventional fuel assemblies. Accordingly, fewer twice pitch bundles may be installed in nuclear reactor as compared to standard size fuel bundles. Fewer control rods, therefore, are needed to control radiation between the fewer twice pitch bundles as compared to standard size fuel bundles. Power is generated with fewer twice pitch fuel bundles as compared to standard size fuel bundles. In addition, refueling time is decreased due to the reduced number of fuel bundles.

The twice pitch bundles provide for a nuclear reactor having a reduced number of control rod drives and a substantial reduction in capital cost as compared with a conventional reactor utilizing conventional fuel bundles. However, such larger bundles typically also require substantial redesign of the fuel assembly, (e.g., with a twice pitch bundle design, the fuel assembly is approximately four times the size of a conventional fuel assembly). Similarly, the larger bundles typically impose more parasitic material in the core, and are more susceptible to bow and bulge. In addition, the ability to perform sub-bundle shuffling, i.e., the ability to reposition individual fuel bundles within the core or remove individual fuel bundles from the core, is substantially compromised with the larger fuel bundles.

It would be desirable to reduce the number of control rod drives without requiring substantial redesign of a fuel assembly. It also would be desirable to reduce the number of control rod drives without substantially compromising the ability to perform sub-bundle shuffling.

SUMMARY OF THE INVENTION

These and other objects may be attained by a nuclear reactor which, in one embodiment, includes at least one large control rod and conventional size fuel assemblies. Particularly, and in accordance with one embodiment of the present invention, at least one large control rod is sized to provide poison control (e.g., negative reactivity) for sixteen conventional size fuel bundles. The large control rod includes four channels defined by a central portion having four blades extending radially therefrom. The channels each are sized to receive one set of four conventional size fuel bundles. The fuel bundles are positioned in a "K" lattice configuration, and each set of four fuel bundles represents approximately twice the pitch of a single conventional size fuel bundle.

The above-described reactor facilitates sub-bundle shuffling for maximum fuel cycle optimization. Such reactor also facilitates reducing refueling time. In addition, such reactor reduces the number of control rod drives by about one-half, as compared to a conventional reactor, and permits refueling four or more conventional fuel assemblies at one time, with an overall reduction in capital cost of the plant and reduced outage time.

DETAILED DESCRIPTION

Figure 1:
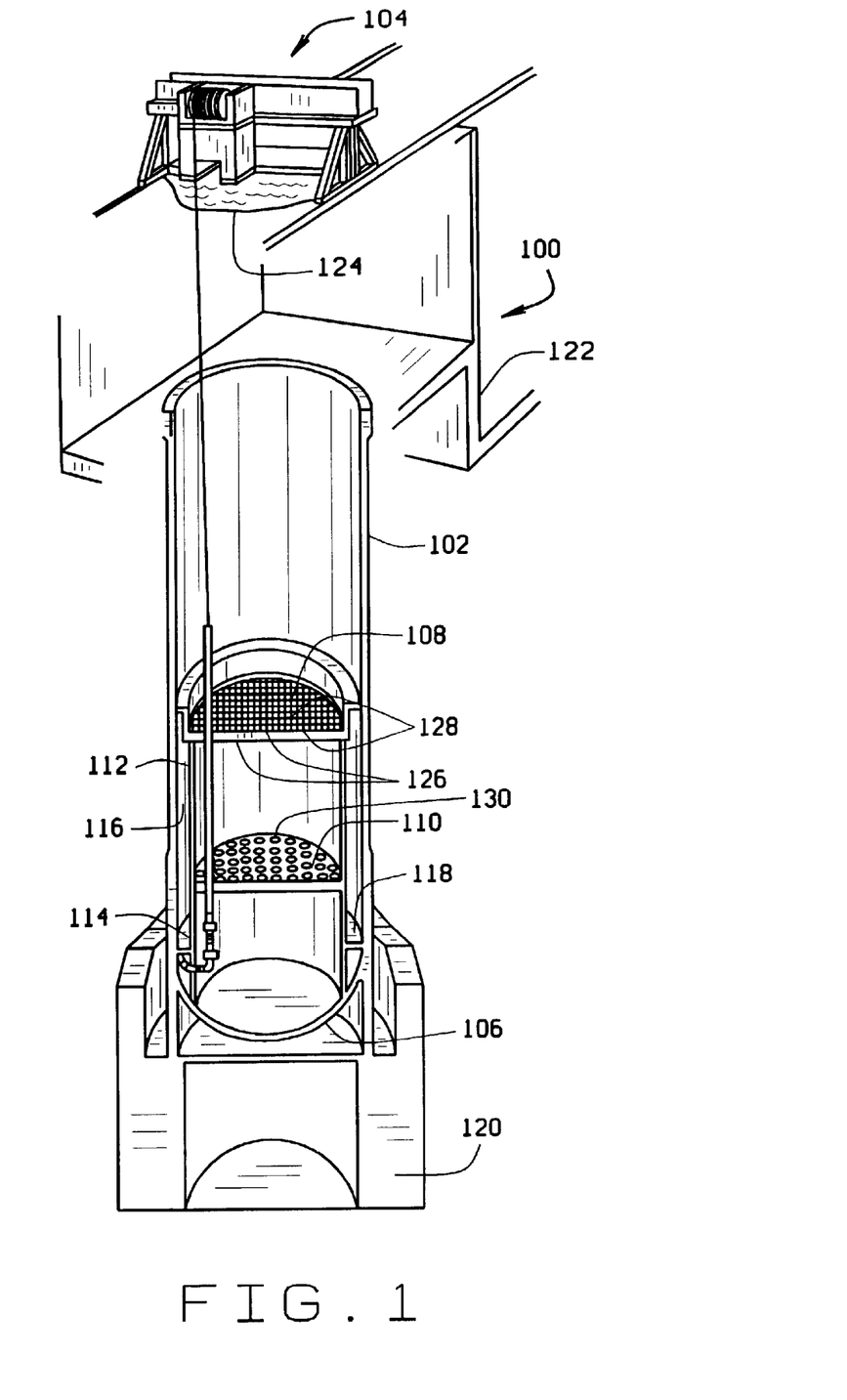
FIG. 1 is a schematic, partial cross section, illustration of a boiling water reactor including a reactor pressure vessel and a bridge.

FIG. 1 is a schematic, partial cross section, illustration of a boiling water reactor 100 including a reactor pressure vessel (RPV) 102 and a bridge 104. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102.

RPV 102 is supported by an RPV support structure 120 and RPV 102 extends into an upper containment 122. Upper containment 122 and RPV 102 are, of course, filled with water. A water level 124 is shown as being just below bridge 104.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported by core plate 110 and top guide beams 126.

Figure 2:
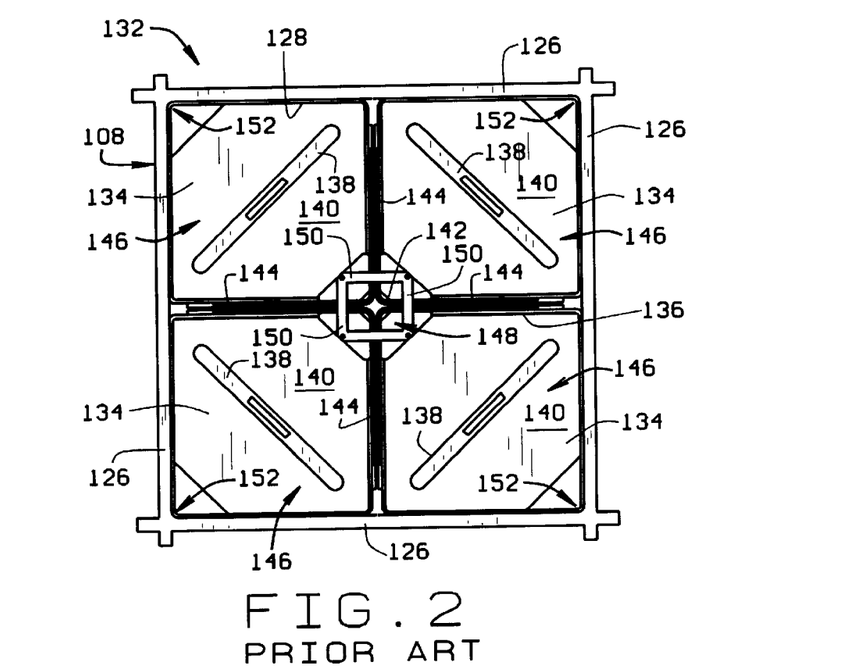
FIG. 2 is a schematic, top view, illustration of a known large control rod and large fuel bundle assembly positioned proximate a top guide opening.

FIG. 2 is a schematic, top view, illustration of a large fuel assembly 132 having four large fuel bundles 134 and a large control rod 136 positioned through one of top guide openings 128. Each large fuel bundle 134 includes a handle 138 adjacent its top end 140, and includes a bundle channel substantially encapsulating a plurality of fuel rods (not shown). Large control rod 136 includes a central portion 142 having four radially extending blades 144. Central portion 142 and blades 144 define four fuel bundle receiving channels 146. Each fuel bundle receiving channel 146 is sized to receive one large fuel bundle 134, and blades 144 facilitate providing poison control between adjacent fuel bundles 134.

A control rod drive (not shown) is coupled to control rod 136 for moving control rod 136 relative to top guide 108. For example, during reactor operation, the control rod drive fully inserts control rod 136 within the area between top guide 108 and core plate 110, and a top portion 148 of control rod 136 is substantially adjacent top guide 108. Alternatively, the control rod drive also may withdraw, entirely or partially, control rod 136 from the area between top guide 108 and core plate 110 so that top portion 148 of control rod 136 is spaced from top guide 108.

Several channel fasteners 150 are coupled to each fuel bundle 134 and facilitate supporting fuel bundles 134 within receiving channels 146. Particularly, channel fasteners 150 each include a spring, and are positioned so that the each spring pushes one of large fuel bundles 134 against a respective corner 152 of top guide opening 128, i.e., all four fuel bundles 134 are pushed against different respective corners 152 of top guide opening 128.

Large fuel bundles 134 have substantially twice the pitch as standard size fuel bundles (not shown) in a conventional BWR fuel configuration. As described above, maximum channel integrated power (i.e., highest radial peaking factor) is greater utilizing large fuel bundles 134 than for a core loaded with conventional size fuel bundles. While this increased pitch is desirable, large fuel bundles 134 substantially prevent performing sub-bundle shuffling, which often is desirable. Moreover, large fuel bundles 134 require larger bundle channels than standard size fuel bundles, and such larger bundle channels are expensive, add more parasitic material in the core region, and may have problems with bend and bow when irradiated.

In accordance with one embodiment of the present invention, and to obtain the benefits of large fuel bundles, i.e., increased peak and reduced control rods and control rod drives, without suffering the burdens identified above, substantially standard size fuel bundles are utilized. Particularly, a nuclear reactor core includes large control rods and conventional size fuel assemblies. Each large control rod is sized to provide poison control (e.g., negative reactivity) for sixteen conventional size fuel assemblies, which are configured as four large bundles. The conventional size fuel assemblies are positioned in a "K" lattice configuration to facilitate minimizing the number of control rod drives and control rods.

Figure 3:
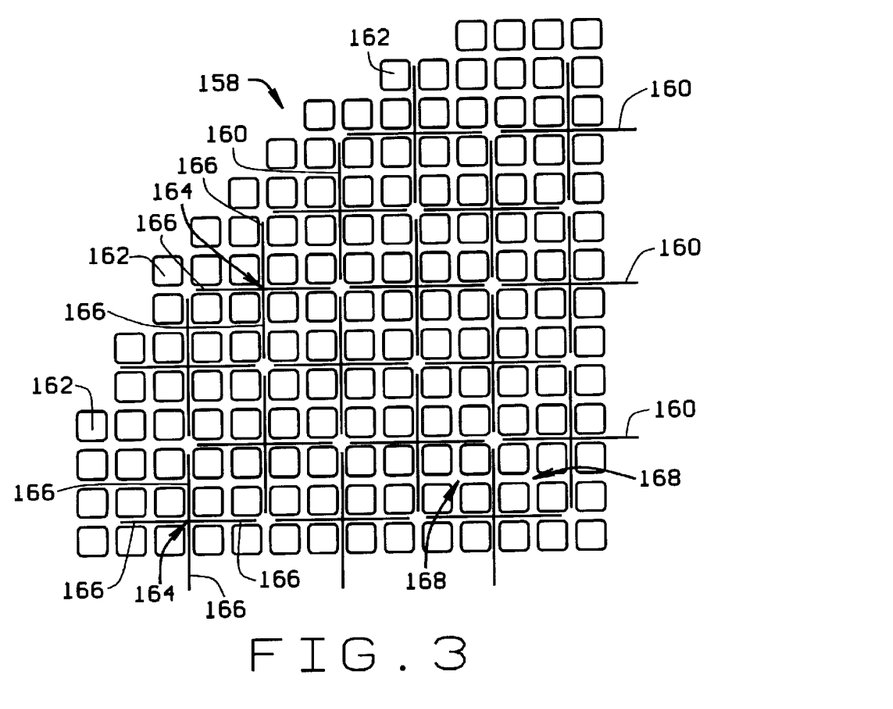
FIG. 3 is a schematic, partial top view, illustration of large control rods and standard size fuel bundles configured in accordance with one embodiment of the present invention.

FIG. 3 is a schematic, partial top view, illustration of a reactor pressure vessel 158 including large control rods 160 and standard size fuel bundles 162 configured in accordance with one embodiment of the present invention. Large control rods 160 each include a central portion 164 having four radially extending blades 166. Large control rods 160 are positioned in a staggered configuration, and fuel bundle receiving channels 168 are formed by blades 166 of adjacent large control rods 160. One group, or set, of four standard size fuel bundles 162 is positioned in each fuel bundle receiving channel 168, i.e., four standard size fuel bundles 162 are positioned between each adjacent large control rod 160. This configuration is sometimes referred to herein as an "F-lattice" configuration. Large control rod blades 166 facilitate providing poison control between adjacent groups of fuel bundles 162.

Figure 4:
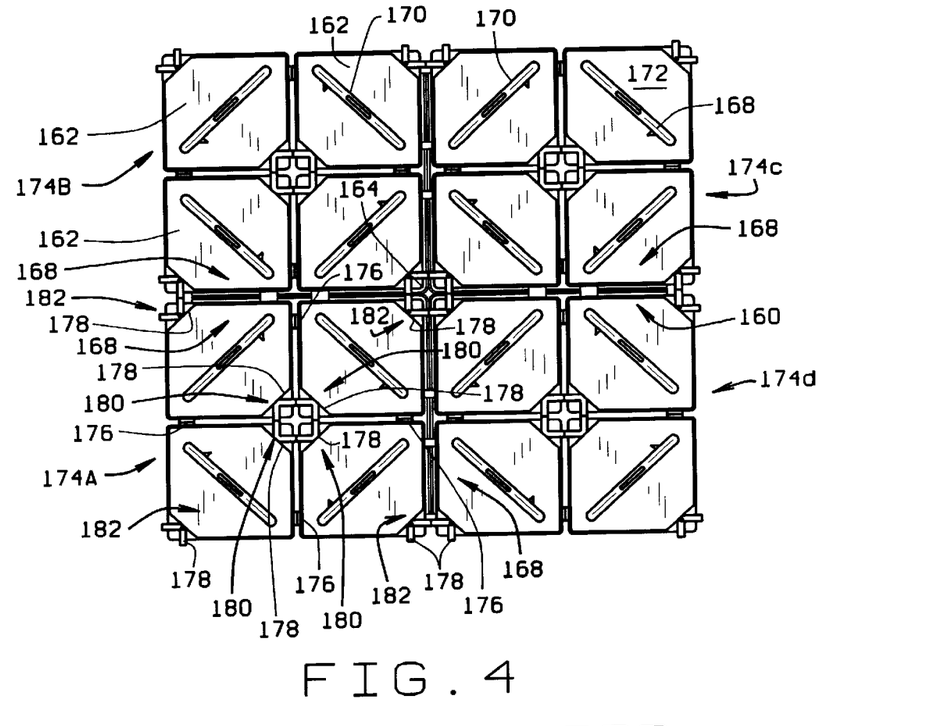
FIG. 4 is a schematic, more detailed, top view of sixteen standard size fuel bundles and one large control rod shown in FIG. 3.

FIG. 4 is a schematic, more detailed, top view of sixteen standard size fuel bundles 162 and one large control rod 160. Each fuel bundle 162 includes a handle 170 extending from its top end 172. Fuel bundles 162 are configured in four groups 174A, 174B, 174C, and 174D, and each group 174A, 174B, 174C, and 174D includes a 2×2 matrix of bundles 162. Each group 174A, 174B, 174C, and 174D also is positioned within a respective fuel bundle receiving channel 168.

With respect to each group 174A, 174B, 174C, and 174D, channel spacers 176 are coupled to each fuel bundle 162 to substantially space each fuel bundle 162 from an adjacent fuel bundle 162. In addition, spring and guard assemblies 178 are coupled to fuel bundles 162 to facilitate supporting fuel bundles 162 within bundle receiving channels 168. For example, and referring only to group 174A of fuel bundles 162, four spring and guard assemblies 178 are substantially centered within group 174A, and are coupled to adjacent corners 180, or central corners, of fuel bundles 162, respectively. Additional spring and guard assemblies 178 are coupled to opposite corners 182, or outer corners, of fuel bundles 162, respectively.

It is believed that spring and guard assemblies 178 substantially obviate any need for a top guide to support fuel bundles 162 within reactor pressure vessel 158. Particularly, spring and guard assemblies 178 coupled to central corners 180 of fuel bundles 162 of each group 174A, 174B, 174C, and 174D cooperate with channel spacers 176 to separate and support each fuel bundle 162 within each group 174A, 174B, 174C, and 174D. Spring and guard assemblies 178 coupled to outer corners 182 of group 174A, 174B, 174C, and 174D cooperate to separate and support fuel bundles 162 of adjacent groups 174A, 174B, 174C, and 174D even without a top guide.

For example, and referring still to FIG. 4, each group 174A, 174B, 174C, and 174D of fuel bundles 162 is substantially supported within reactor pressure vessel 158 by adjacent groups 174A, 174B, 174C, and 174D of fuel bundles. More particularly, each fuel bundle 162 in group 174A, for example, includes one spring and guard assembly 178 coupled to outer corner 182. Each such assembly 178 is substantially in physical contact with a spring and guard assembly 178 which is coupled to a fuel bundle 162 of an adjacent group of fuel bundles 162. For example, one spring and guard assembly 178 of group 174A is in physical connection with one spring and guard assembly 178 of group 174B. Similarly, one spring and guard assembly 178 of group 174A is in physical connection with one spring and guard assembly 178 of group 174D. In addition, another spring and guard assembly 178 of group 174A is in physical connection with one spring and guard assembly of another adjacent group (not shown) of fuel bundles 162. Accordingly, spring and guard assemblies 178 are coupled to each fuel bundle 162 and separate and support each fuel bundle 162 with respect to an adjacent one of fuel bundles 162.

Figure 5:
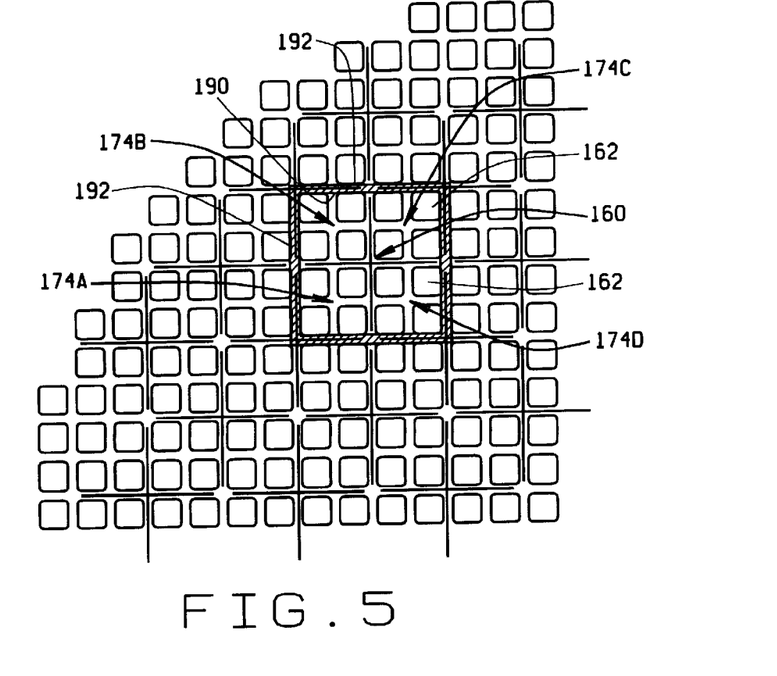
FIG. 5 is a schematic, partial top view, illustration of the control rods and fuel bundles shown in FIG. 3 positioned adjacent a substantially large top guide opening.

FIG. 5 is a schematic, partial top view, illustration of large control rods 160 and fuel bundles 162 positioned adjacent a large top guide opening 190, or cell opening, which, as described above, is defined by a lattice of top guide beams 192. One of large control rods 160 is substantially centered within top guide opening 190, and sixteen fuel bundles 162, i.e., four groups 174A, 174B, 174C, and 174D of fuel bundles 162 are substantially aligned within top guide opening 190.

Figure 6:
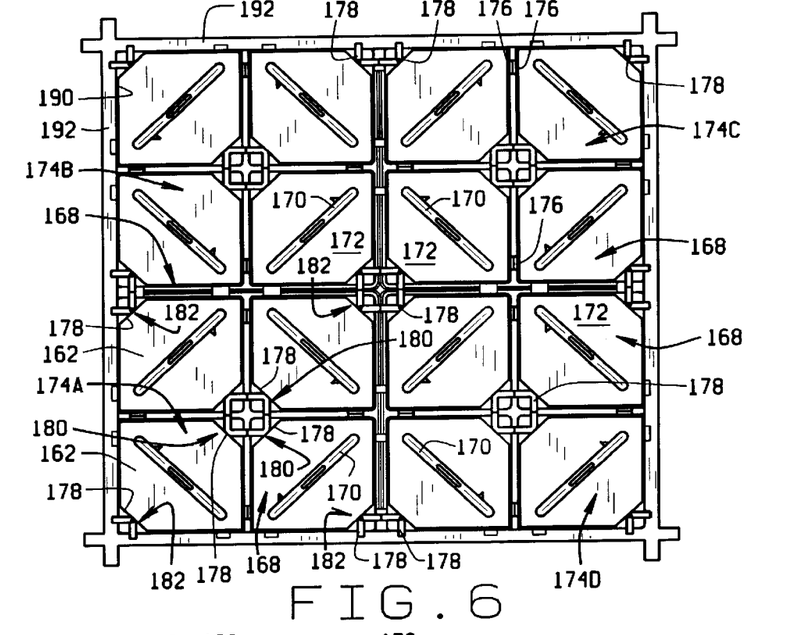
FIG. 6 is a schematic, more detailed, top view of sixteen standard size fuel bundles and one large control rod adjacent the large top guide opening shown in FIG. 5.

FIG. 6 is a schematic, more detailed, top view of groups 174A, 174B, 174C, and 174D of standard size fuel bundles 162 and one of large control rods 160 adjacent large top guide opening 190. As described above, a handle 170 extends from top end 172 of each fuel bundle 162. Each group 174A, 174B, 174C, and 174D includes a 2×2 matrix of bundles 162 and is positioned within a respective bundle receiving channel 168 of large control rod 160.

Channel spacers 176 are coupled to each fuel bundle 162 to space each fuel bundle 162 from an adjacent fuel bundle 162 within each group 174A, 174B, 174C, and 174D, respectively. In addition, spring and guard assemblies 178 are coupled to each fuel bundle 162 and facilitate supporting fuel bundles 162 within bundle receiving channels 168. For example, and referring only to group 174A of fuel bundles 162, four spring and guard assemblies 178 are centered within group 174A, and are coupled to central corners 180 of fuel bundles 162 in group 174A. Additional spring and guard assemblies 178 are coupled to outer corners 182 of fuel bundles 162 in group 174A.

In this configuration, large top guide beams 192 provide lateral support for sixteen fuel bundles 162. In addition, spring and guard assemblies 178 and channel spacers 176 cooperate with beams 192 to support and stabilize bundles 162 within respective bundle receiving channels 168. Particularly, and as shown, spring and guard assemblies 178 of outer corners 182 of each group 174A, 174B, 174C, and 174D are in physical connection with either large control rod 160 or top guide beams 192. Accordingly, spring and guard assemblies 178 of outer corners 182 substantially cooperate with control rod 160 and top guide beams 192 to support each group 174A, 174B, 174C, and 174D or bundles 162 within respective bundle receiving channels 168.

Spring and guard assemblies 178 are coupled to bundles 162 and positioned above top guide beams 192. In addition, channel spacers 176 also are positioned above top guide beams 192. Such positioning is believed to facilitate positioning groups 174A, 174B, 174C, and 174D of bundles 162 within each bundle receiving channel 168, and facilitates moving individual bundles 162 from a group 174A, 174B, 174C, and 174D.

Figure 7:
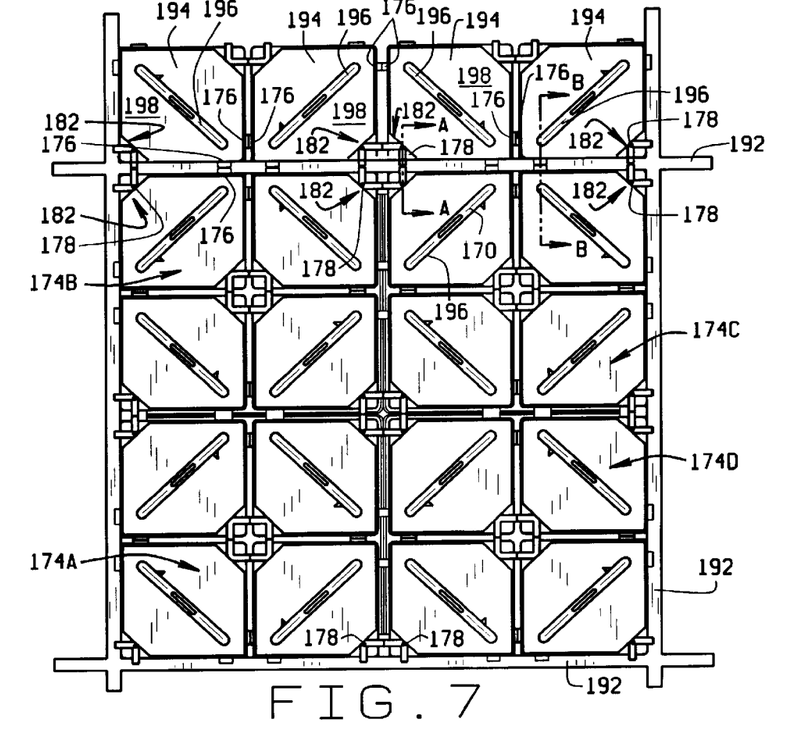
FIG. 7 is a schematic top view illustration of the bundles and control rod shown in FIG. 6 positioned adjacent additional fuel bundles.

FIG. 7 is a schematic top view illustration of fuel bundles 162 and large control rod 160 positioned adjacent additional fuel bundles 194. Additional fuel bundles 194 are the same as fuel bundles 162 and include a handle 196 extending from a top end 198 thereof. Spring and guard assemblies 178 are coupled to additional fuel bundles 194 and substantially abut spring and guard assemblies 178 coupled to opposite corners 182 of fuel bundles 162 in group 174B and 174C, respectively. In addition, channel spacers 176 are coupled to additional fuel bundles 194 and couple to channel spacers 176 which are coupled to fuel bundles 162 in groups 174B and 174C.

Figure 8:
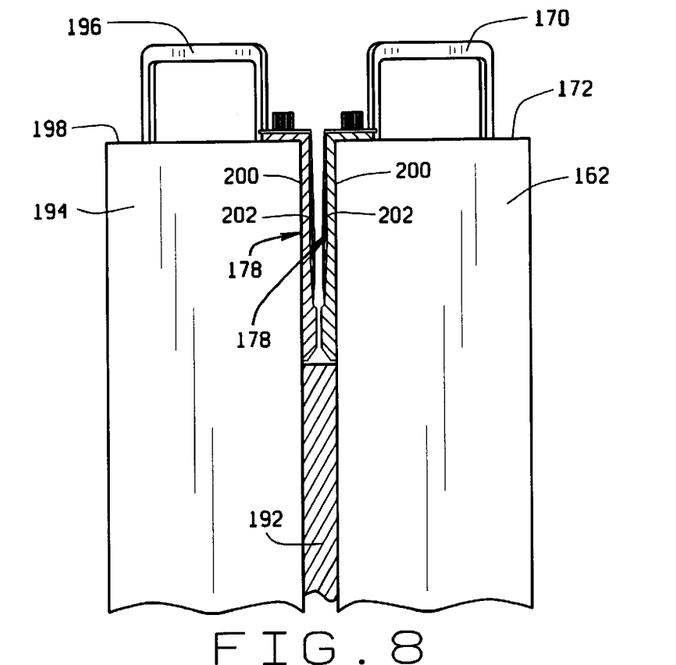
FIG. 8 is a cross sectional view along A—A shown in FIG. 7.

FIG. 8 is a cross sectional view along the line A—A shown in FIG. 7. Fuel bundles 194 and 162 each extend above top guide beam 192. One spring and guard assembly 178 is coupled to each fuel bundle 194 and 162, respectively, to support fuel bundles 162 and 194. Each spring and guard assembly 178 includes a channel guard 200 and a spring 202. With respect to fuel bundle 162, channel guard 200 is coupled to top end 172 and extends between fuel bundles 162 and 194. Spring 202 also is coupled to top end 172 of fuel bundle 162, and extends between fuel bundles 162 and 194 so that channel guard 200 is between spring 202 and fuel bundle 162. Similarly, and with respect to fuel bundle 162, channel guard 200 and spring 202 are coupled to top end 198, and extend between fuel bundles 162 and 194 so that springs 202 are substantially adjacent.

Figure 9:
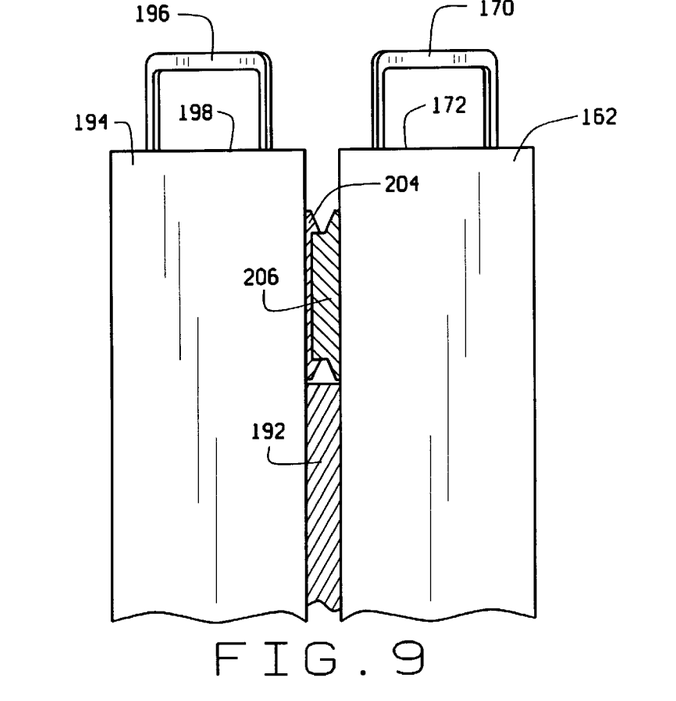
FIG. 9 is a cross sectional view along B—B shown in FIG. 7.

FIG. 9 is a cross sectional view along the line B—B shown in FIG. 7. Channel spacer 176 includes a male portion 204 and a female portion 206. Male portion 204 is coupled to one fuel bundle 194 and female portion 206 is coupled to one of adjacent fuel bundles 162. Each portion 204 and 206 is positioned above top guide beam 192, and male portion 204 is inserted into female portion 206.

Figure 10:
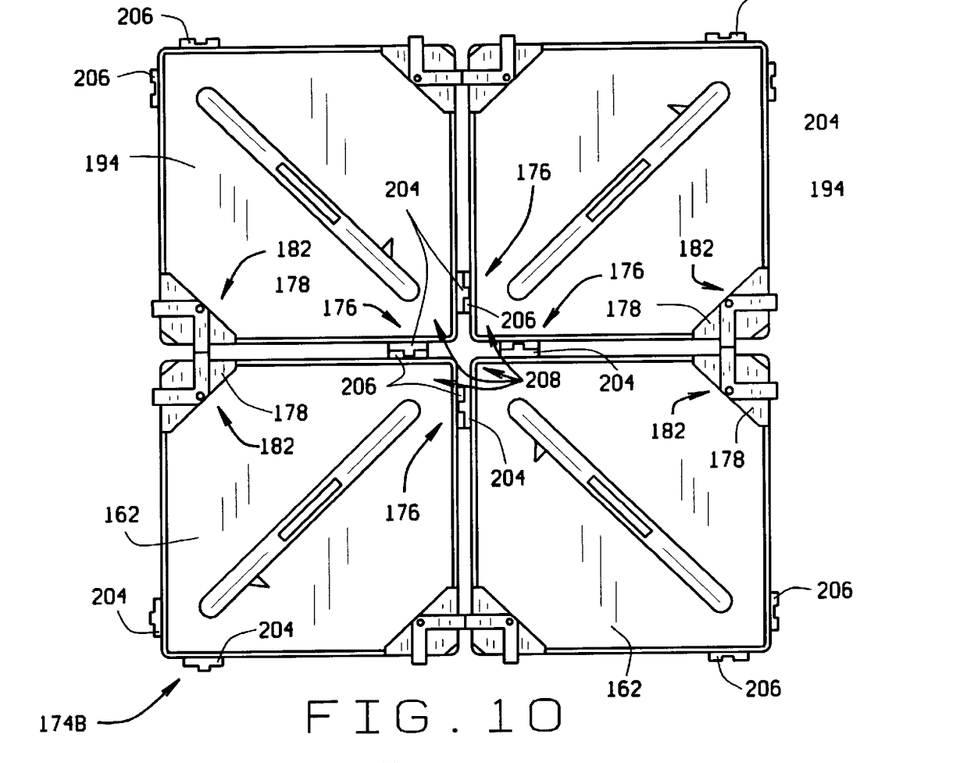
FIG. 10 is an exploded schematic top view illustration of four adjacent fuel bundles shown in FIG. 6.

FIG. 10 is an exploded schematic top view illustration of two fuel bundles 162 of group 174B adjacent two fuel bundles 194 shown in FIG. 7. Channel spacers 176 each include a male portion 204 and a female portion 206 and are positioned proximate corners 208 of fuel bundles 162 in group 174B and fuel bundles 194. Male portions 204 of each channel spacer 176 interlock with female portions 206 of each channel spacer 176 to separate each fuel bundle 162 from one of adjacent fuel bundles 162 and one of adjacent fuel bundles 192. In addition, male portions 204 and female portions 206 facilitate removing only one of fuel bundles 162 or only one of fuel bundles 194 during refueling. Of course, more than one fuel bundle 162 or more than one fuel bundle 194 may be removed during refueling.

Figure 11:
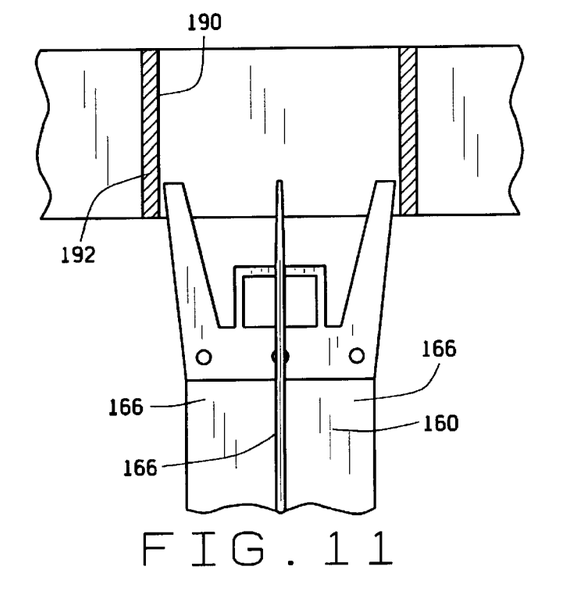
FIG. 11 is an illustration of a large control rod substantially aligned with one of the top guide openings.

FIG. 11 illustrates a large control rod 160 substantially aligned with one of top guide openings 190. Large control rod 160 is substantially free standing, and is positioned within top guide opening 190 so that blades 166 are substantially adjacent top guide beams 192 (only two top guide beams 192 are shown). Accordingly, top guide beams 192 support large control rod 160 within top guide opening 190.

Figure 12:
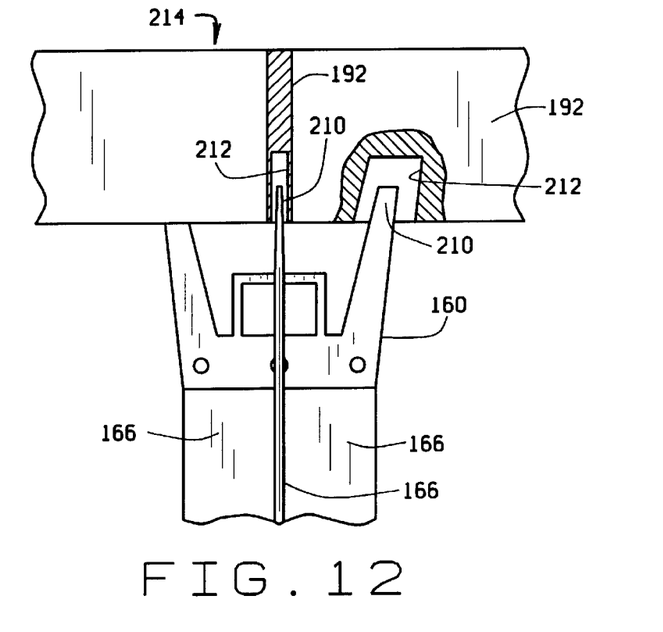
FIG. 12 is an illustration of a large control rod positioned underneath and interlocking with a top guide beam.

In the "K" lattice configuration, however, several large control rods 160 are not substantially aligned with one of top guide openings 190. FIG. 12 illustrates one such large control rod 160 positioned underneath top guide beams 192, but not substantially aligned with a top guide opening 190. As shown, top portions 210 of each blade 166 are configured to be inserted at least partially in top guide beams 192. Particularly, each top guide beam 192 includes a recess 212 sized to receive top portion 210 of one of blades 166. Accordingly, beams 192 substantially support top portions 210 of blades 166, and thus substantially support large control rod 160.

Figure 13:
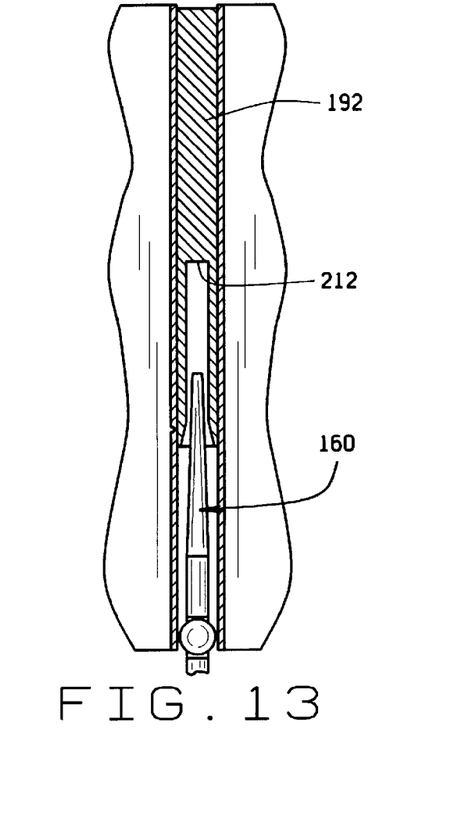
FIG. 13 is an exploded view illustration of the control rod and top guide shown in FIG. 12 with the control rod in a lowered position.
Figure 14:
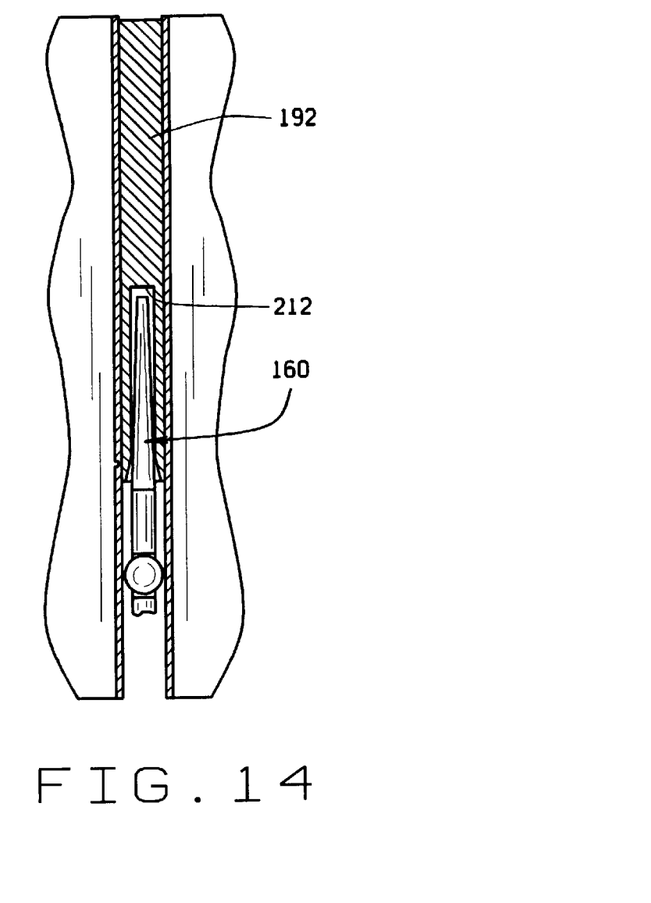
FIG. 14 is an exploded view illustration of the control rod and top guide shown in FIG. 12 with the control rod in a raised position.

Recess 212 also is sized to accommodate any control rod drive overtravel. Particularly, FIGS. 13 and 14 are exploded views of large control rod 160 and top guide beams 192 with large control rod 160 in a lowered position and a raised position, respectively.

The above described reactor including large control rods and conventional size assemblies is believed to be operational both with and without a top guide. In addition, such reactor facilitates sub-bundle shuffling, i.e., moving one conventional size fuel bundle at a time, for maximum fuel cycle optimization. Furthermore, such reactor reduces the number of control rod drives by about one-half, as compared to a conventional reactor, and permits refueling four or more conventional fuel assemblies at one time, with an overall reduction in capital cost of the plant and reduced outage time.

It is to be understood that the present invention is not limited to practice in reactor 100 and the present invention could be used in may different reactors having many different alternative configurations. Reactor 100 is illustrated by way of example only and not by way of limitation.

Figure 15:
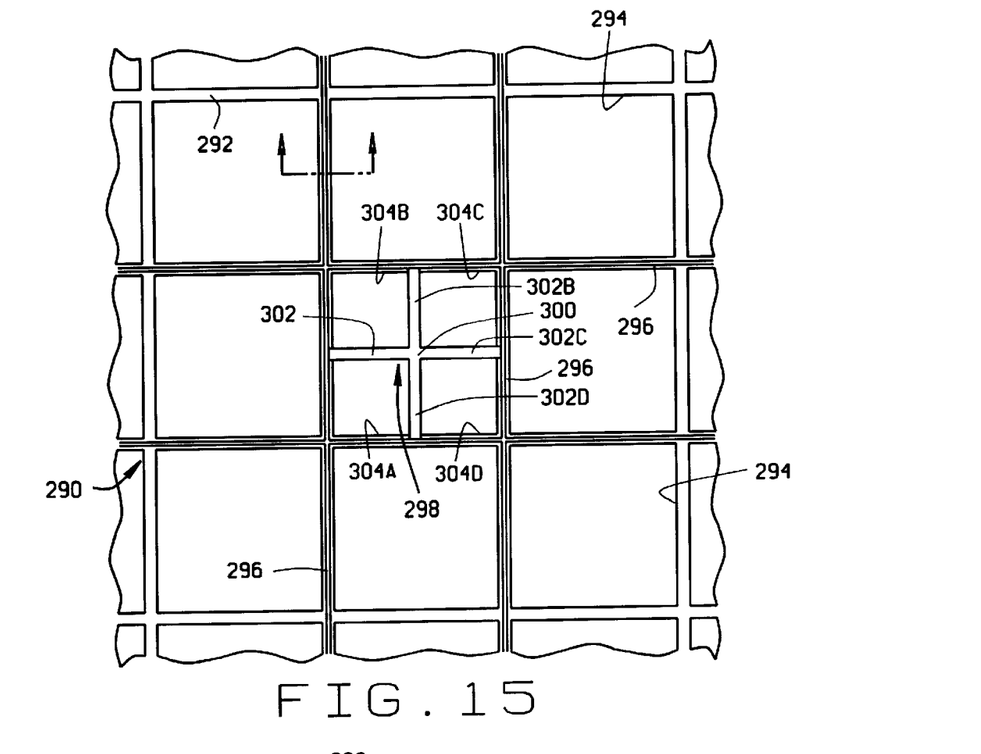
FIG. 15 is a partial top view illustration of a top guide having chimney partitions and a removable support element utilized in accordance with another embodiment of the present invention.

For example, FIG. 15 is a partial top view illustration of a top guide 290 in accordance with another embodiment of the present invention. Top guide 290 includes a lattice of top guide beams 292 defining large top guide, or cell, openings 294 (only nine cell opening 294 is shown in FIG. 15). Several of top guide beams 292 include chimney partitions 296 extending therefrom, and each cell opening 294 is sized to received sixteen fuel bundles in the "F-lattice" configuration, i.e., four groups 174A, 174B, 174C, and 174D of four fuel bundles 162.

Top guide 290 further includes several removable support elements 298 (only one support element 298 is shown in FIG. 15) coupled to top guide beams 292 and extending across cell openings 294. Each support element 298 includes a central portion 300 having four legs 302A, 302B, 302C, and 302D extending therefrom. Each leg 302A, 302B, 302C, and 302D extends from central portion 300 so that an angle between each leg 302A, 302B, 302C, and 302D and an adjacent leg 302A, 302B, 302C, and 302D, is approximately ninety degrees. Each leg 302A, 302B, 302C, and 302D is coupled to one top guide beam 292 so that support element 298 defines four group openings 304A, 304B, 304C, and 304D within each cell opening 294, and each group opening 304A, 304B, 304C, and 304D is sized to receive four fuel bundles, i.e., one group 174A, 174B, 174C, and 174D of fuel bundles 162.

Figure 16:
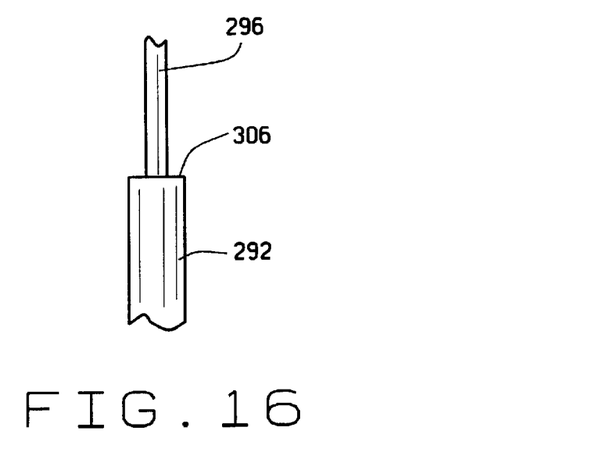
FIG. 16 is a cross-section view along 16—16 shown in FIG. 15.
Figure 17:
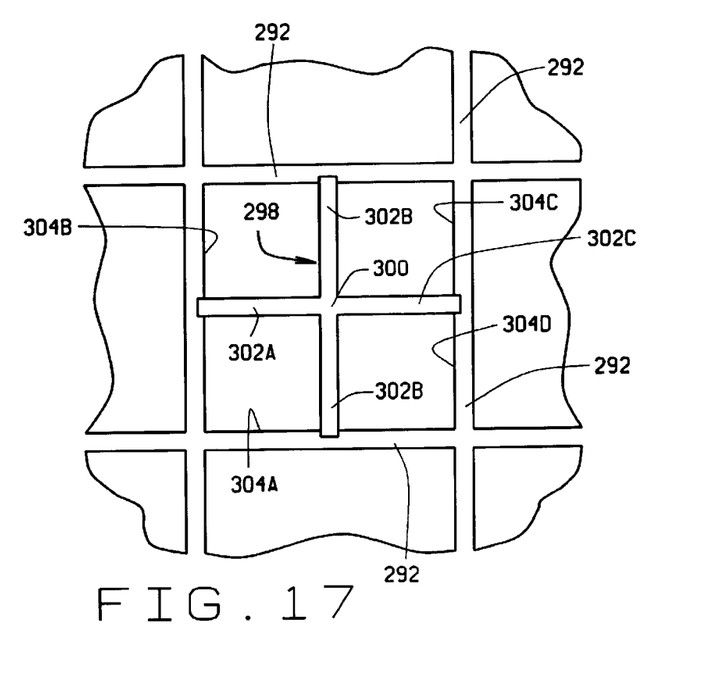
FIG. 17 illustrates a support element coupled to top guide beams which do not include chimney partitions.

FIG. 16 illustrates more clearly a chimney partition 296 extending from an upper surface 306 of one top guide beam 292. FIG. 17 illustrates a support element 298 coupled to top guide beams 292 which do not include chimney partitions 296.

Figure 18:
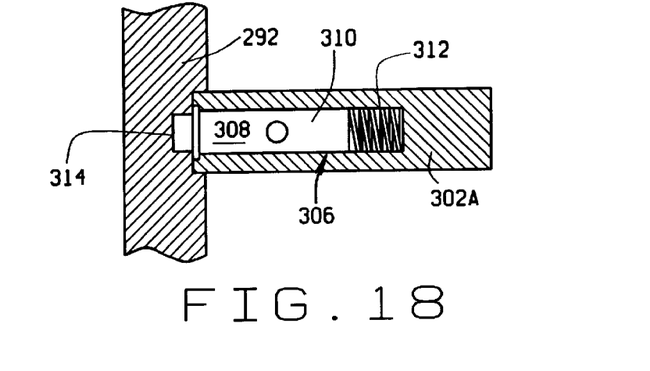
FIG. 18 is detailed view of one support element leg coupled to one top guide beam in accordance with one embodiment of the present invention.

Referring now to FIG. 18, support element legs 302A, 302B, 302C, and 302D (only leg 302A is shown in FIG. 17) are coupled to respective top guide beams 292 (only one top guide beam 292 is shown in FIG. 17) utilizing latch assemblies 308 (only one latch assembly 308 is shown in FIG. 17). Referring specifically to support element leg 302A, latch assembly 308 includes a spring-mounted latch member 310 mounted to leg 302A with a spring element 312 so that latch member 310 may move relative to leg 302A. In an extended position (shown in FIG. 18), one end of latch member 310 extends through an engaging element 314 which is coupled to top guide beam 292 and couples leg 302A to top guide beam 292. In a retracted position (not shown in FIG. 18), latch member 310 does not engage engaging element 314 and enables leg 302A to be removed from top guide beam 292. Each additional leg 302B, 302C, and 302D is coupled to additional top guide elements 292 in the same manner.

To prepare a reactor for operation, removable support elements 298 are coupled to top guide beams 292 to define several group openings 304A, 304B, 304C, and 304D. One group of four fuel bundles, e.g., fuel bundles 162, is inserted through each group opening 304A, 304B, 304C, and 304D, and the individual fuel bundles are substantially supported within the reactor by top guide beams 292 and support element legs 302A, 302B, 302C, and 302D. Accordingly, removable support elements 298 are believed to obviate any need for channel spacers 176 and spring and guard assemblies 178 between adjacent groups, e.g., groups 174A, 174B, 174C, and 174D, of fuel bundles.

In addition, removable support elements 298 do not substantially inhibit the removal of large control rods from the reactor. Specifically, to remove a large control rod, e.g., large control rod 160, aligned with a cell opening 294, the removable support element 298 extending across such cell opening 294 is detached and removed from respective top guide beams 292. The control rod is then lifted through cell opening 294.

Figure 19:
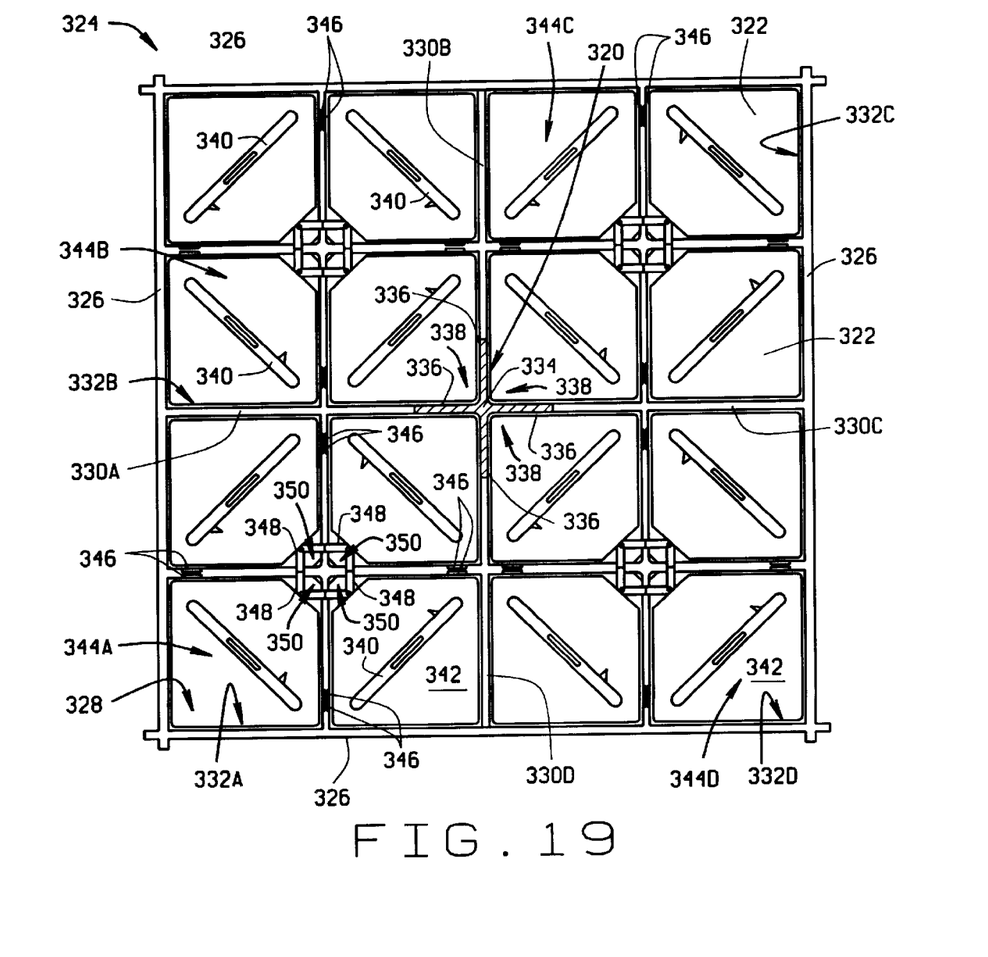
FIG. 19 is a schematic, partial top view, illustration of a large control rod and sixteen standard size fuel bundles positioned adjacent a top guide constructed in accordance with yet another embodiment of the present invention.

FIG. 19 is a schematic, partial top view, illustration of a large control rod 320 and sixteen standard size fuel bundles 322 arranged in a F-lattice configuration and positioned adjacent a top guide 324 in accordance with yet another embodiment of the present invention. Top guide 324 includes a lattice of top guide beams 326 defining large top guide, or cell, openings 328 (only one cell opening 328 is shown in FIG. 18). Top guide 324 further includes several top guide beam segments 330A, 330B, 330C, and 330D extending from top guide beams 326 to define group chambers, or group openings, 332A, 332B, 332C, and 332D, within each cell opening 328. Beam segments 330A and 330C are substantially aligned and extend from opposite top guide beams 326. Similarly, beam segments 330B and 330D are substantially aligned and extend from opposite top guide beams 326 so that a line extending between beam segments 330B and 330D is substantially perpendicular to a line extending between beam segments 330A and 330C.

Large control rod 320 is substantially aligned with cell opening 328 and, like large control rods 160, includes a central portion 334 having four radially extending blades 336 which define four fuel bundle receiving channels 338. Blades 336 are substantially aligned with respective top guide beam segments 330A, 330B, 330C, and 330D, so that fuel bundle receiving channels 338 are aligned with group openings, 332A, 332B, 332C, and 332D. One group, or set, of four standard size fuel bundles 322 is positioned in each group opening 332A, 332B, 332C, and 332D. Large control rod blades 336 facilitate providing poison control between adjacent groups of fuel bundles 322.

Each fuel bundle 322 includes a handle 340 extending from its top end 342. Fuel bundles 322 are configured in four groups 344A, 344B, 344C, and 344D, and each group 344A, 344B, 344C, and 344D includes a 2×2 matrix of bundles 322. Each group 344A, 344B, 344C, and 344D also, as described above, is positioned within a respective group opening 332A, 332B, 332C, and 332D.

With respect to each group 344A, 344B, 344C, and 344D, channel spacers 346 are coupled to each fuel bundle 322 to substantially space each fuel bundle 322 from an adjacent fuel bundle 322 in such group 344A, 344B, 344C, and 344D. In addition, spring and guard assemblies 348 are coupled to fuel bundles 322 to facilitate supporting each group 344A, 344B, 344C, and 344D of fuel bundles 322 within its respective group opening 332A, 332B, 332C, and 332D. For example, and referring only to group 344A of fuel bundles 322, four spring and guard assemblies 348 are substantially centered within group 344A, and are coupled to adjacent corners 350, or central corners, of fuel bundles 322, respectively. In addition, channel spacers 346 are coupled to each bundle 322 to support each adjacent bundle 322 within group 344A. Spring and guard assemblies 348 and channel spacers 346 cooperate with top guide beams 326 and beam segments 330A and 330D to support group 344A of bundles 322 within respective group opening 332A.

Each other group 344B, 344C, and 344D of bundles 322 is similarly supported with respect to group openings 332B, 332C, and 332D. Particularly, spring and guard assemblies 348 and channel spacers 346 cooperate with top guide beams 326 and beam segments 330A and 330B to support group 344B of bundles 322 within respective group opening 332B, spring and guard assemblies 348 and channel spacers 346 cooperate with top guide beams 326 and beam segments 330B and 330C to support group 344C of bundles 322 within respective group opening 332C, and spring and guard assemblies 348 and channel spacers 346 cooperate with top guide beams 326 and beam segments 330C and 330D to support group 344D of bundles 322 within respective group opening 332D.

Figure 20:
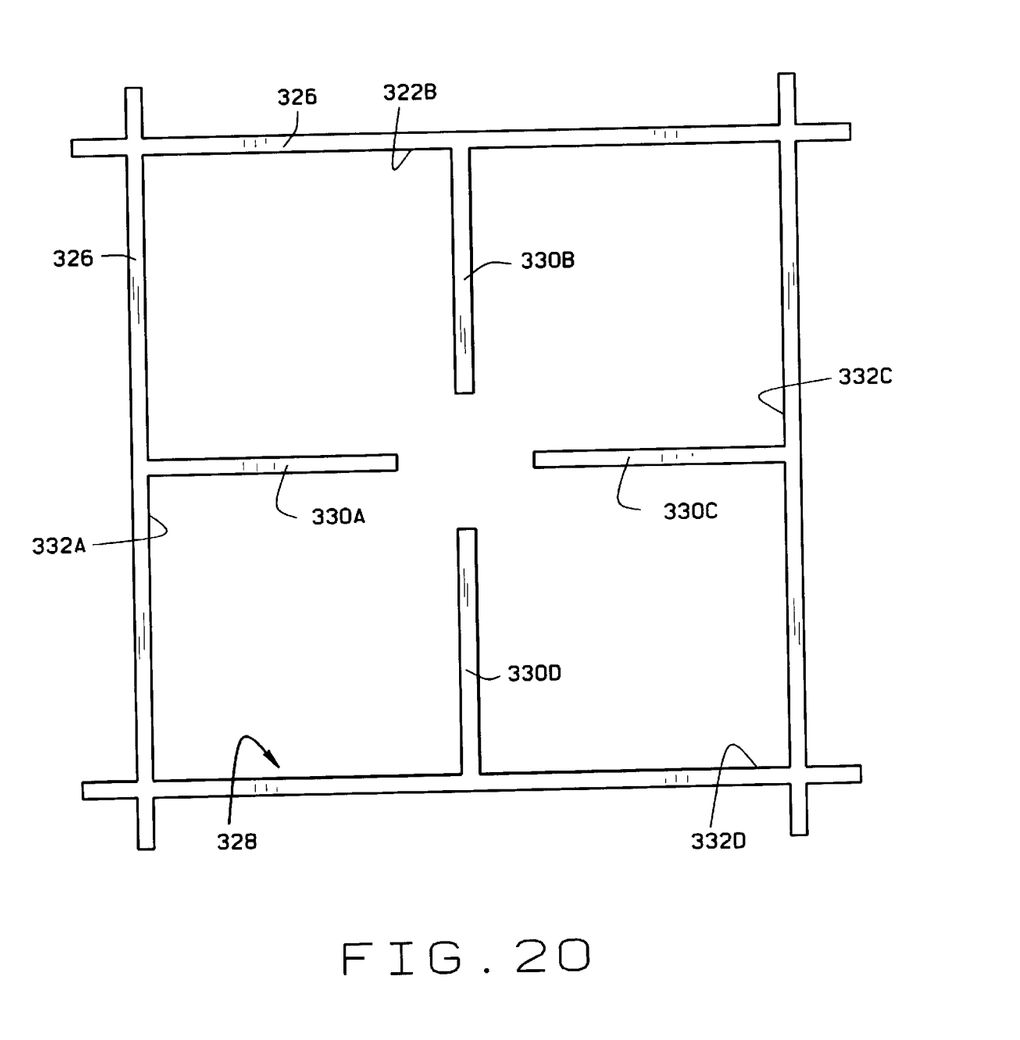
FIG. 20 illustrates the top guide beams and beam segments shown in FIG. 19 without fuel bundles and without the large control rod.
Figure 21:
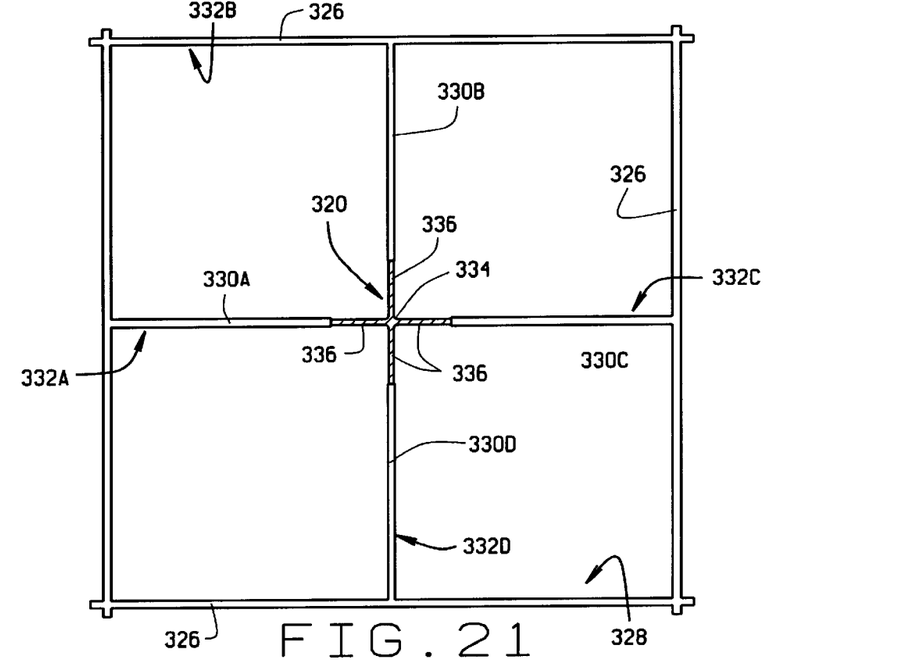
FIG. 21 illustrates the top guide beams and beam segments shown in FIG. 19 without the fuel bundles and with the large control rod.
Figure 22:
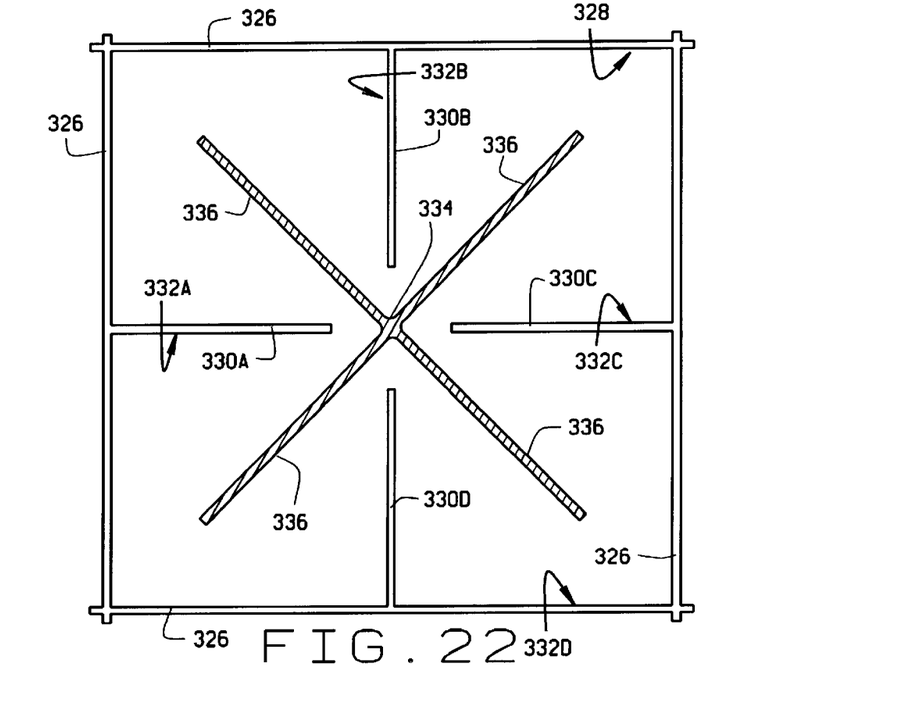
FIG. 22 illustrates the top guide beams and beam segments shown in FIG. 21 with large control rod rotated for removal from the reactor.

FIG. 20 illustrates top guide beams 326 and beam segments 330A, 330B, 330C, and 330D, without fuel bundles 322 and large control rod 320. FIG. 21 illustrates top guide beams 326 and beam segments 330A, 330B, 330C, and 330D, without fuel bundles 322 and with large control rod blades 336 substantially aligned with respective beam segments 330A, 330B, 330C, and 330D. FIG. 22 illustrates top guide beams 326 and beam segments 330A, 330B, 330C, and 330D, without fuel bundles 322 and with large control rod 320 rotated for removal from the reactor. Particularly, while rotated, large control rod 320 may be lifted through cell opening 328 so that blades 336 extend through respective group openings 332A, 332B, 332C and 332D.

The above-described top guide including beam segments 330A, 330B, 330C, and 330D obviates any need for channel spacers 176 and spring and guard assemblies 178 between adjacent groups, e.g., groups 174A, 174B, 174C, and 174D, of fuel bundles, as described with respect to FIGS. 3 through 14. In addition, such beam segments 330A, 330B, 330C, and 330D, do not substantially inhibit the removal of large control rods from the reactor.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A reactor pressure vessel of a nuclear reactor comprising:
   a top guide having a plurality of top guide beams and top guide beam segments, said top guide beams defining a plurality of cell openings, said top guide beam segments extending from said top guide beams to define a plurality of group openings within each of said cell openings, each said group opening sized to receive a plurality of fuel bundles;
   a core plate spaced from said top guide; and
   a plurality of fuel bundles and a plurality of large control rods arranged in an F-lattice arrangement, each said large control rod comprising four fuel bundle receiving channels, each said fuel bundle receiving channel sized to receive a same number of fuel bundles as each of said group openings, said large control rod movable between said core plate and said top guide.

2. A reactor pressure vessel in accordance with claim 1 wherein each said cell opening is sized to receive sixteen fuel bundles and wherein each group opening is sized to receive four fuel bundles.

3. A reactor pressure vessel in accordance with claim 1 wherein said plurality of fuel bundles extend between said top guide and said core plate, at least one of said fuel bundles positioned in one of said group openings.

4. A reactor pressure vessel in accordance with claim 3 further comprising a spring and guard assembly coupled to at least one of said fuel bundles.

5. A reactor pressure vessel in accordance with claim 3 further comprising a channel spacer coupled to at least one of said fuel bundles.

6. A reactor pressure vessel comprising:
   a plurality of fuel bundles;
   a plurality of large control rods arranged in an F-lattice arrangement, each said large control rod comprising four fuel bundle receiving channels, at least one of said channels sized to receive at least two of said fuel bundles therein; and
   a top guide having a plurality of group openings, each said group opening sized to receive a same number of fuel bundles as one of said fuel bundle receiving channels.

7. A reactor pressure vessel in accordance with claim 6 wherein said group openings are sized to receive four fuel bundles.

8. A reactor pressure vessel in accordance with claim 6 wherein said top guide comprises a plurality of beams defining a plurality of cell openings, each said cell opening sized to receive a plurality of fuel bundles, and a plurality of beam segments, said beam segments extending from said top guide beams to define a plurality of group openings within each of said cell openings.

9. A reactor pressure vessel of a nuclear reactor comprising:
   a top guide having a plurality of top guide openings;
   a core plate spaced from said top guide; and
   a plurality of fuel bundles and a plurality of large control rods arranged in an F-lattice arrangement, each said large control rod comprising four fuel bundle receiving channels, each said fuel bundle receiving channel sized to receive a plurality of fuel bundles, each said large control rod movable between said core plate and said top guide.

10. A reactor pressure vessel in accordance with claim 9 wherein each said large control rod comprises a central portion having four blades extending therefrom, said blades defining four fuel bundle receiving channels.

11. A reactor pressure vessel in accordance with claim 9 wherein each said fuel bundle receiving channel is sized to receive four fuel bundles.

12. A reactor pressure vessel in accordance with claim 9 wherein said top guide comprises a plurality of top guide beams, and wherein each said large control rod is configured to be inserted in at least one of said top guide beams.

13. A reactor pressure vessel in accordance with claim 12 wherein each said large control rod comprises a central portion having a plurality of blades extending therefrom, said top guide further comprises a plurality of top guide beams, and wherein at least one of said top guide beams includes at least one recess sized to receive a portion of one of said blades.

14. A reactor pressure vessel in accordance with claim 9 wherein said plurality of fuel bundles extend between said top guide and said core plate, at least one of said fuel bundles positioned in one of said fuel bundle receiving channels.

15. A reactor pressure vessel in accordance with claim 14 further comprising a spring and guard assembly coupled to at least one of said fuel bundles.

16. A reactor pressure vessel in accordance with claim 14 further comprising a channel spacer coupled to at least one of said fuel bundles.

* * * * *